United States Patent
Kazumi et al.

(10) Patent No.: US 7,461,375 B2
(45) Date of Patent: Dec. 2, 2008

(54) PRINT MANAGING APPARATUS, DEVICE DRIVER REGISTERING METHOD, AND DEVICE DRIVER REGISTERING PROGRAM

(75) Inventors: Kenichi Kazumi, Kanagawa (JP); Satoshi Tanaka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 495 days.

(21) Appl. No.: 10/406,308

(22) Filed: Apr. 4, 2003

(65) Prior Publication Data
US 2003/0217194 A1 Nov. 20, 2003

(30) Foreign Application Priority Data
Apr. 9, 2002 (JP) .............................. 2002-106954
Mar. 31, 2003 (JP) .............................. 2003-094591

(51) Int. Cl.
*G06F 9/445* (2006.01)
(52) U.S. Cl. .................................................... 717/176
(58) Field of Classification Search ......... 717/174–178; 709/201–203, 230–232; 705/1; 358/1.14–1.15
See application file for complete search history.

(56) References Cited

U.S. PATENT DOCUMENTS

| | | | | |
|---|---|---|---|---|
| 5,625,757 A * | 4/1997 | Kageyama et al. | ......... | 358/1.14 |
| 5,845,078 A * | 12/1998 | Tezuka et al. | ............... | 709/222 |
| 6,301,012 B1 * | 10/2001 | White et al. | ............... | 358/1.15 |
| 6,424,424 B1 * | 7/2002 | Lomas et al. | ............... | 358/1.14 |
| 6,493,871 B1 * | 12/2002 | McGuire et al. | ............. | 717/173 |
| 6,671,749 B2 * | 12/2003 | Williams et al. | ............. | 710/10 |
| 6,859,832 B1 * | 2/2005 | Gecht et al. | ................. | 709/224 |
| 6,922,258 B2 * | 7/2005 | Pineau | ...................... | 358/1.15 |
| 6,958,824 B2 * | 10/2005 | Whitmarsh | ............... | 358/1.15 |
| 6,976,084 B2 * | 12/2005 | Pineau et al. | .............. | 709/232 |
| 6,978,299 B1 * | 12/2005 | Lodwick | ...................... | 709/223 |
| 6,989,910 B2 * | 1/2006 | Lomas et al. | .............. | 358/1.15 |
| 7,084,998 B2 * | 8/2006 | Blair et al. | ................. | 358/1.15 |
| 7,099,034 B2 * | 8/2006 | Anderson et al. | .......... | 358/1.15 |
| 7,213,060 B2 * | 5/2007 | Kemp et al. | ................. | 709/222 |
| 2002/0184378 A1 * | 12/2002 | Pineau et al. | ............... | 709/230 |
| 2003/0005050 A1 * | 1/2003 | Pineau et al. | ............... | 709/203 |
| 2003/0011801 A1 * | 1/2003 | Simpson et al. | ............ | 358/1.13 |
| 2003/0184793 A1 * | 10/2003 | Pineau | ...................... | 358/1.15 |

(Continued)

OTHER PUBLICATIONS www.NETGEAR.com "print servers", Jan. 24, 2002, http://web.archive.org/web/20020124072316/http://www.netgear.com/, http://web.archive.org/web/20020202115622/www.netgear.com/categories.asp?xrp=6&yrp?15, p. 1.*

(Continued)

*Primary Examiner*—Wei Y Zhen
*Assistant Examiner*—Anna Deng
(74) *Attorney, Agent, or Firm*—Fitzpatirck, Cella, Harper & Scinto

(57) ABSTRACT

In a system in which a client, a plurality of output devices, and a server are connected via a network, it is an object to enable a device driver to be installed into the server by a remote operation of the client and eliminate troublesomeness upon setting of a construction of a port. A Web server has a port constructing unit and a driver installing unit which operate in response to a remote instruction from the client and its construction is realized by making those units operative under the local system authority.

16 Claims, 7 Drawing Sheets

U.S. PATENT DOCUMENTS

2004/0017583 A1* 1/2004 Kageyama et al. ......... 358/1.15

OTHER PUBLICATIONS

NETGEAR, Inc, "Reference Manual for NETGEAR PS100 series Print Servers", Apr. 2002, pp. 1-133.* www.NETGEAR.com, "NETGEAR Print Servers PS 105/110", http://web.archive.org/web/20020202115622/www.netgear.com/categories.asp?xrp=6&yrp=15, p.1-2.*

Ju et al. "An efficient and lightweight embedded Web server for web-based network element management", Sep. 2000, John Wiley & sons, Inc, International Journal of Network Management, vol. 10, Issue 5, pp. 261-275.*

Newman et al. "Designing for serendipity: supporting end-user configuration of ubiquitous computing environments", Jun. 2002, ACM, pp. 147-156.*

* cited by examiner

FIG. 6

PRINT MANAGING APPARATUS, DEVICE DRIVER REGISTERING METHOD, AND DEVICE DRIVER REGISTERING PROGRAM

BACKGROUND OF THE INVENTION

1. Field of the Invention

The invention relates to a technique for installing a device driver of an output device into a server in a system including a client terminal, the server, and the output device connected to a network in response to an instruction from THE client terminal. More particularly, the invention relates to a print managing apparatus as a server for installing a device driver, a device driver registering method, and a device driver registering program.

2. Related Background Art

In recent years, there has existed a mechanism such that documents to be printed or outputted are managed in a server having a Web server function (hereinafter, referred to as a Web server), the Web server is accessed from a browser of a client connected to the Web server via a network, and a printing/outputting instruction of the documents managed in the Web server is made by the client, thereby printing/outputting the documents managed in the Web server. According to such a system, since the documents can be unitarily managed in the Web server, the management becomes easy, and since the documents are managed in the Web server and downloading of the documents by the client is not permitted, there is also an advantage in terms of security.

In recent years, since prices of printers and facsimile apparatuses, which are connected to the network for connecting the Web server and the clients have been lowered, a plurality of output devices (an electrophotographic printer, an ink jet printer, a facsimile apparatus, a digital hybrid apparatus, and the like) exist on the network. In this case, for example, in order to use the printer, it is necessary that a printer driver corresponding to the printer on the print destination side has been installed in a computer for forming print data. Generally, since the user of the client (owner of the client) can install the printer driver to be used, the printer driver which is necessary for the printer on the print destination side has properly been installed in each client.

However, in a remote print system such that the Web server manages the documents, the print instruction is made to the Web server by the client, and the forming process of print data based on the documents is executed on the Web server, printer devices which can be used for printing by the client who makes the print instruction are limited to the devices in which the printer driver has previously been installed in the Web server. Also in the case where the client requests the Web server to make remote facsimile transmission, it is necessary that a facsimile driver has been installed in the Web server. However, as mentioned above, many output devices exist on the network, so that, frequently, it is not the case that the device drivers corresponding to the output devices which the clients want to use have always been installed in the Web server for managing the documents.

To add the device, which can be used by such a system, therefore, the device driver (printer driver/facsimile driver) corresponding to the device has to be installed in the Web server by the operation by an administrator. At the same time, a port corresponding to the device has to be formed and its communication protocol has to be set.

However, as network environments are enlarged, port management becomes complicated, because it is necessary to construct the port by the server operation and set a communication protocol as mentioned above in the conventional procedure, so that it is a large problem.

SUMMARY OF THE INVENTION

In consideration of the above circumstances, it is an object of the invention to provide a print managing apparatus, a device driver registering method, and a device driver registering program, in which a device driver can be easily installed in response to a remote instruction from a client without executing a complicated server operation.

According to the invention, there is provided a print managing apparatus connected to a client and an output device via a network, comprising: port constructing means for, when an installing instruction of a device driver is received from the client, constructing a port on the basis of an IP address of the output device included in the installing instruction; and driver installing means for, when the installing instruction of the device driver is received from the client, installing the corresponding device driver on the basis of device identification information included in the installing instruction, wherein the port constructing means and the driver installing means operate under local system authority.

A device driver registering method and a device driver registering program are a method and a program for realizing the above construction.

According to the invention, the user of a client terminal can easily install a device, which he wants to use into a server by a remote operation without executing a complicated operation. If the device is a printer, since the construction of a printer port, setting of a communication protocol, and the like are automatically executed on the server side, troublesomeness upon installing can be eliminated.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 6 is an image diagram showing a display screen of the client terminal on which a list of search results of the printers has been displayed in the remote print system according to the embodiment of the invention;

DESCRIPTION OF THE PREFERRED EMBODIMENTS

Preferred embodiments of the invention will be described hereinbelow with reference to the drawings.

Figure 1:
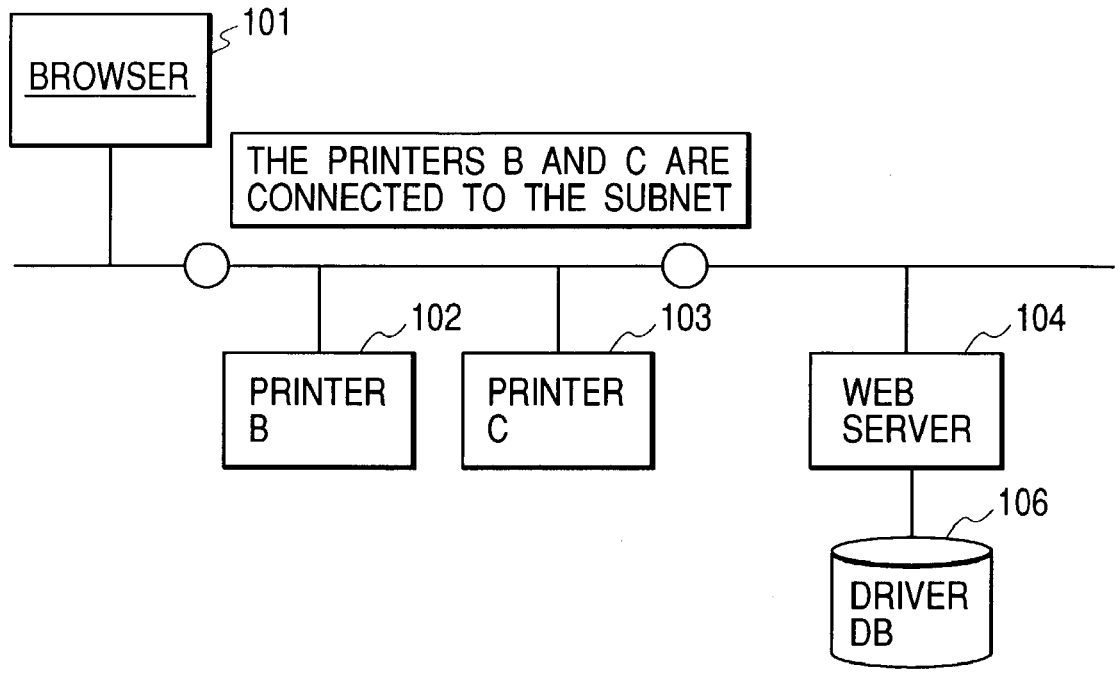
FIG. 1 is a schematic diagram showing a network construction of a remote print system according to an embodiment of the invention.

FIG. 1 is a schematic diagram showing a network construction of a remote print system as a preferred example of a system according to an embodiment of the invention.

According to the remote print system, a client terminal 101 in which a browser has been installed, a printer B 102 and a printer C 103 as output devices, and a server in which a function of a Web server serving as a print managing apparatus of the invention has been installed (hereinafter, such a server is referred to as a Web server) 104 are connected to a network, and the printer B 102, the printer C 103, and the Web server 104 are connected by different subnets. A driver DB 106 is connected to the Web server 104. The driver DB 106 is a database in which a plurality of printer drivers for printers supported by the present system has been stored. Device drivers have been managed in correspondence to device identification (ID) information (device ID/device name). The driver DB 106 can be stored in a memory in the Web server 104.

Although the embodiments of the invention will be described by using a printer, which is preferable as an output device, the invention is not limited to it. The "output device" used here is a peripheral apparatus connected to the network and includes an apparatus which is directly or indirectly controlled by the device driver which is installed into a computer. For example, the output devices include an electrophotographic printer, an ink jet printer, a facsimile apparatus, a digital hybrid apparatus, a network scanner, a digital camera which can be connected to the network, and the like. That is, effects of the invention are obtained by other devices so long as they are directly or indirectly controlled by the device driver, which is installed into the computer. Naturally, those devices are incorporated as targets of the embodiments of the invention. However, the printer as a preferred example is used in the following description.

In this system, the Web server 104 can search the printers 102 and 103 in the designated network in response to the search instruction from the browser of the client 101. The user selects the printer to be used from the printers 102 and 103 found by the search. A print instruction of the documents stored in the Web server 104 is transmitted from the client 101 to the Web server 104. In the Web server 104, the print-instructed document is read out, print data is formed by using the printer driver, and the print data is transmitted to the printer on the output destination side, thereby executing printing by the printer.

First, in the client 101, when a search execute button of the browser is pressed as a search instruction from the browser, the client 101 issues a parameter of the search instruction to the Web server 104 by a POST command of an HTTP. The Web server that received the parameter broadcasts an SNMP to the subnet where its own Web server exists and searches the device connected to the same subnet as that of the Web server 104. Since a searching method of the device is a known technique, its specific explanation is omitted.

Figure 2:
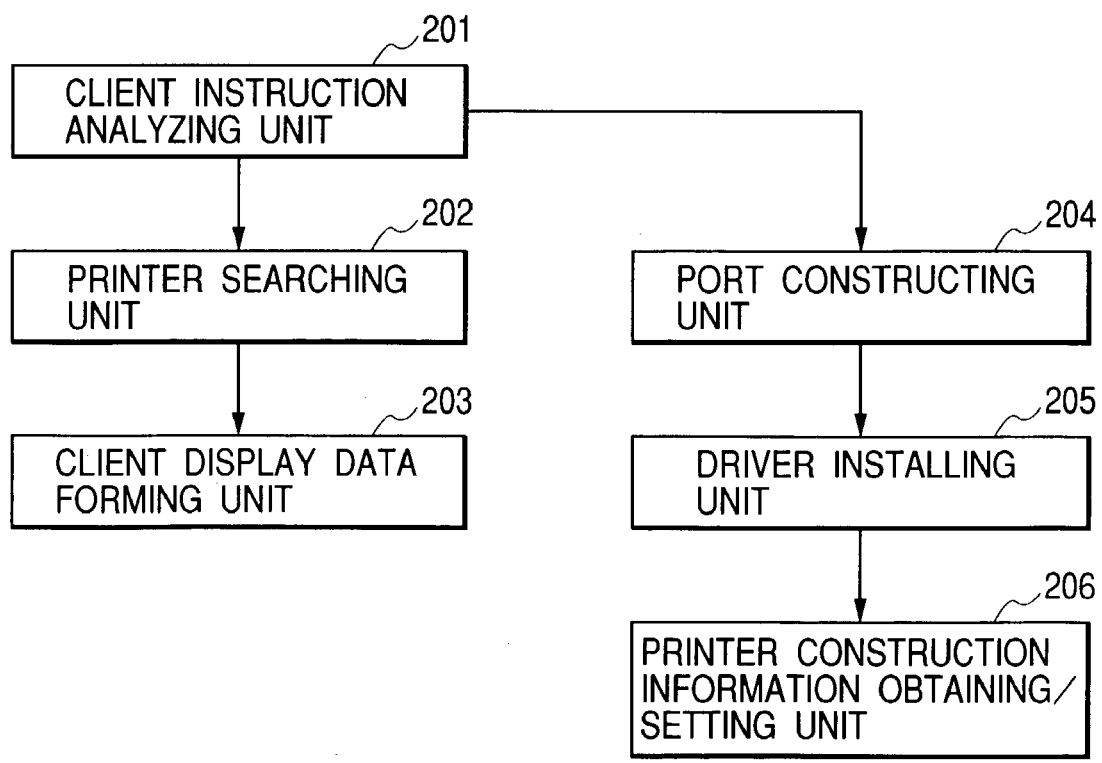
FIG. 2 is a schematic diagram showing a construction of a Web server in the remote print system according to the embodiment of the invention.

FIG. 2 is a schematic diagram showing a construction of the Web server 104.

In the diagram, reference numeral 201 denotes a client instruction analyzing unit for discriminating the instruction from the client terminal 101. The client instruction analyzing unit 201 analyzes the instruction from the client 101 and discriminates whether it is the search instruction of the printers (output device) or the installing instruction of the printer driver (device driver). Reference numeral 202 denotes a printer searching unit for searching the printers 102 and 103 in the same subnet as that of the Web server 104 on the basis of the search instruction of the printers from the client terminal 101. When a reply is returned from the printer in the subnet and the printer is searched by the broadcast of the SNMP, the printer searching unit 202 notifies a client display data forming unit 203 of the information of the searched printer. Reference numeral 203 denotes the client display data forming unit for forming client display data by taking a form of structure display data with a tag (for example, HTML format) from the search result so that a printer list to be displayed onto the client terminal 101 side is displayed by the browser of the client 101. Reference numeral 204 denotes a port constructing unit for forming a port to install the printer driver. The port constructing unit 204 forms the port on the basis of an IP address of the printer (output device) on the output destination side in response to the installing instruction of the printer driver from the client 101. Reference numeral 205 denotes a driver installing unit for installing the driver of the printer. A driver installing process will be described in detail hereinlater. Reference numeral 206 denotes a printer construction information obtaining/setting unit for obtaining information of functions provided for the printer.

The operation of the Web server 104 will now be described.

Figure 3:
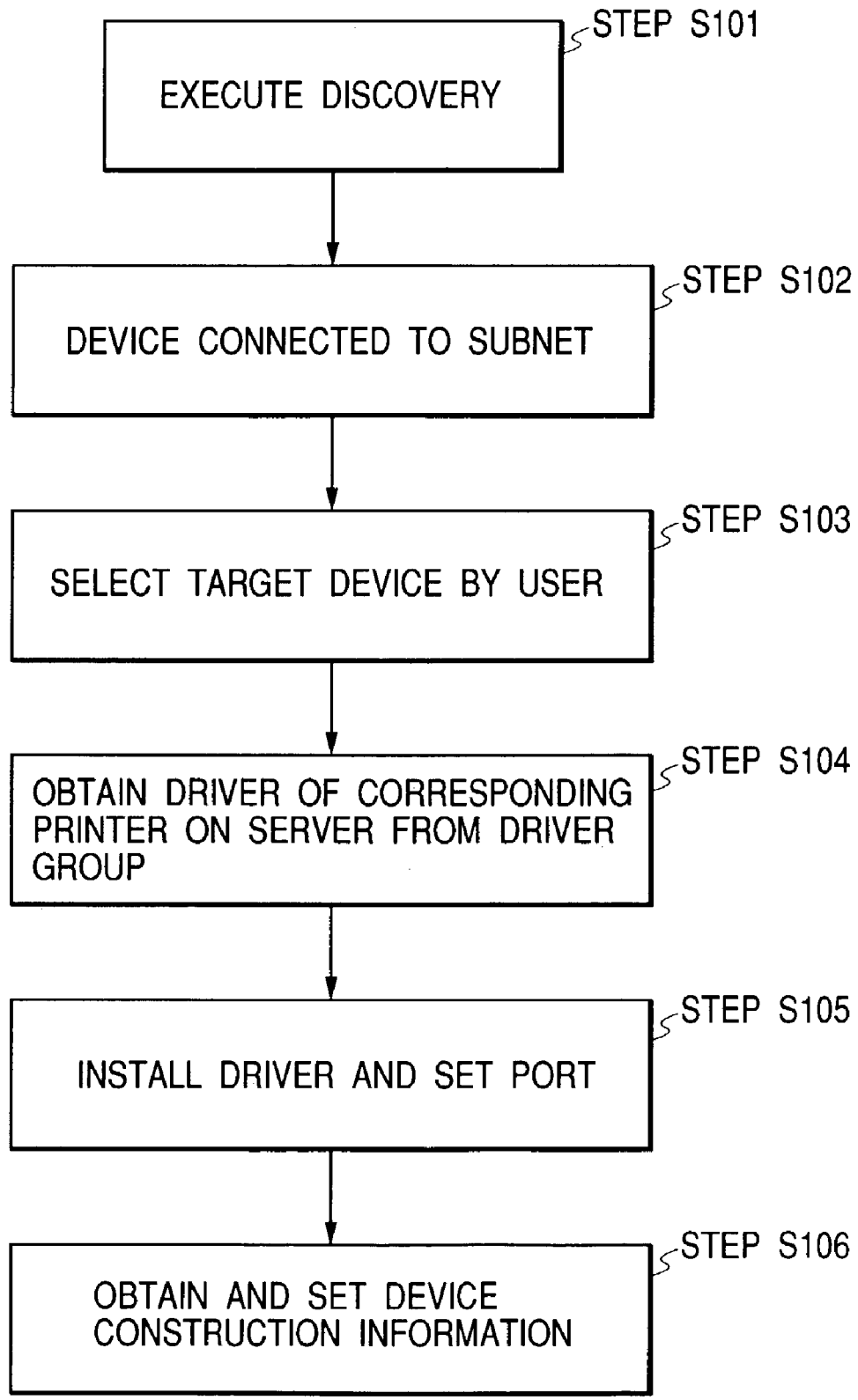
FIG. 3 is a flowchart showing a procedure, which is executed in a range from a search of a printer to installation of a printer driver in the remote print system according to the embodiment of the invention.

FIG. 3 is a flowchart showing a procedure for the operation of the Web server 104.

In step S101, when the Web server 104 receives some instruction from the client terminal 101, the instruction is discriminated by the client instruction analyzing unit 201. If the instruction is the search instruction of the printers, the printer searching unit 202 executes the broadcast of the SNMP to the same subnet as that of the Web server 104, thereby starting the search of the printers 102 and 103.

Figure 4:
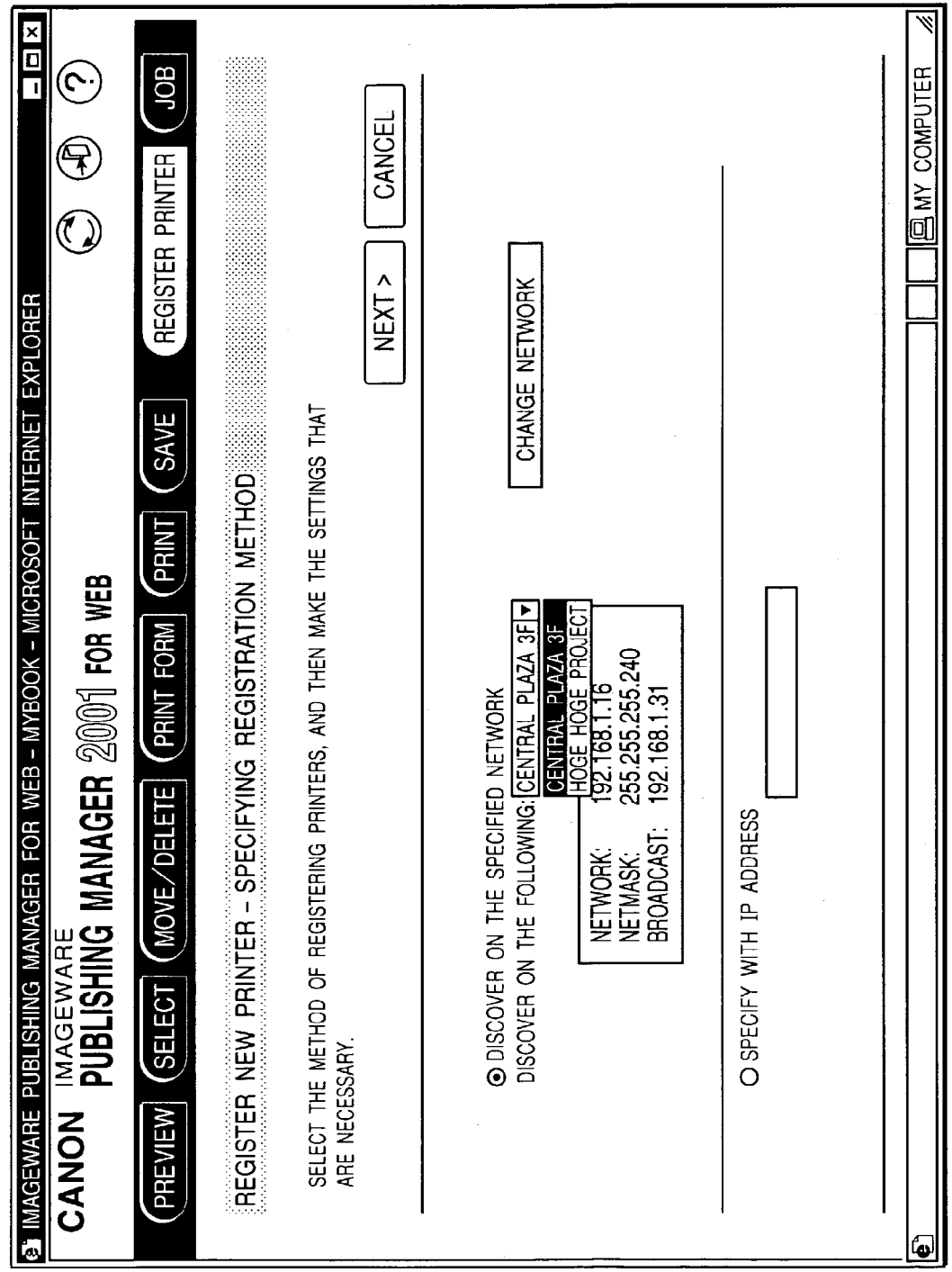
FIG. 4 is an image diagram showing a display screen of a client terminal for issuing a search instruction of the printers to the Web server in the remote print system according to the embodiment of the invention.

FIG. 4 shows a display screen of the client terminal 101 for issuing the search instruction of the printers 102 and 103 to the Web server 104. On this display screen, the user selects an address of the subnet to search the printers 102 and 103 from a drop-down list and presses a "Next" button. At timing of depressing this button, the parameter (including the subnet address) of the search instruction is issued to the Web server 104 by the POST command of the HTTP and the Web server is notified of the search instruction.

Figure 5:
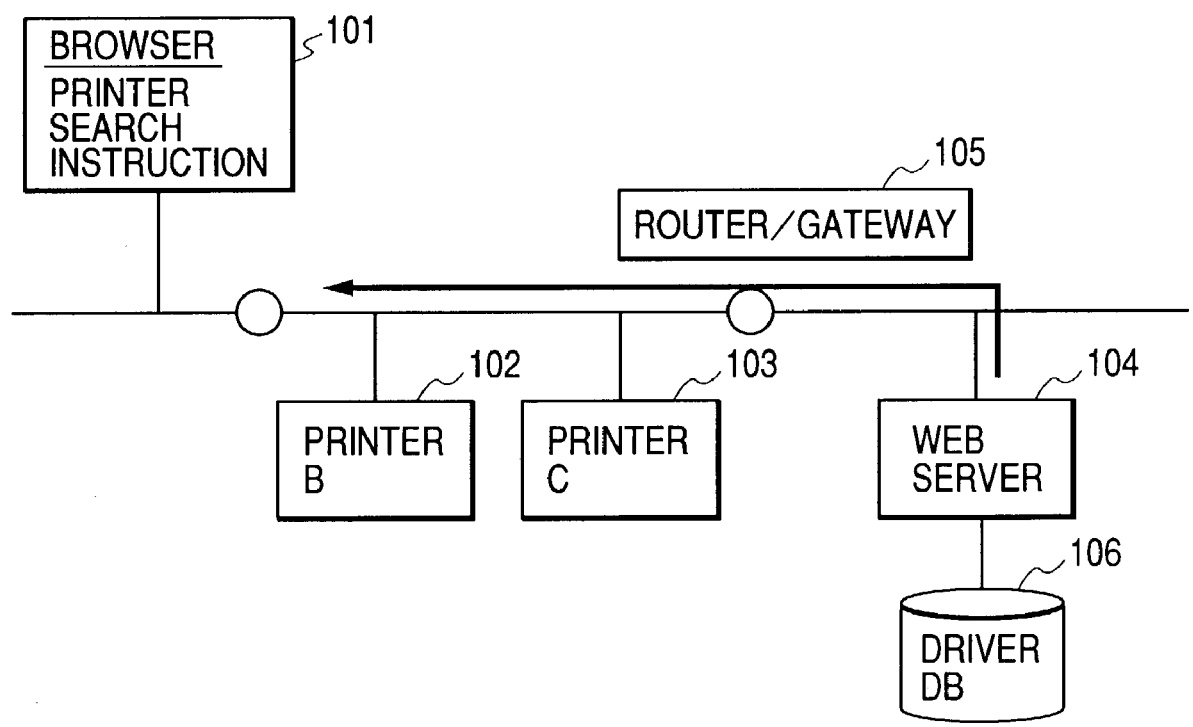
FIG. 5 is a schematic diagram showing a path of the search instruction transmitted from a browser in the remote print system according to the embodiment of the invention.

FIG. 5 is a schematic diagram showing along which path on the network the search instruction notified from the client terminal 101 is transferred. First, the search instruction from the browser reaches the Web server 104. The Web server 104 broadcasts the subnet address designated by the search instruction of the POST command by the printer searching unit 202 in accordance with a communication protocol (SNMP) which has been predetermined in the subnet. In step S102 in FIG. 3, the broadcast of this communication protocol reaches the designated subnet via a Router/GateWay 105 as shown in the diagram. All of the printers 102 and 103 connected to the network are searched. The Web server 104 receives a reply from each device, thereby obtaining information such as an IP address and the like of the device, which is necessary for forming the port and installing the device driver.

Figure 6:
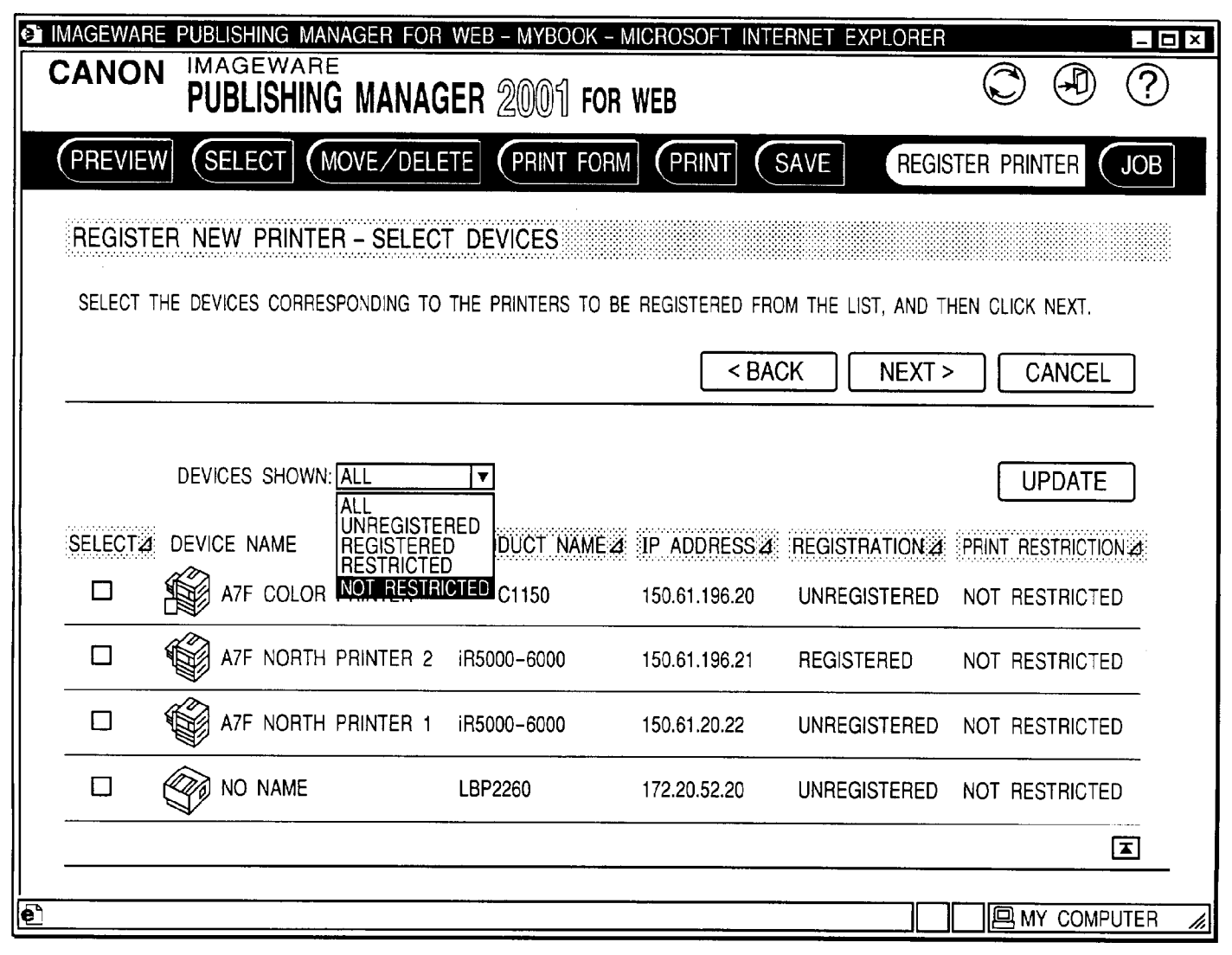

To notify the client terminal 101 of those information after the search of the printers 102 and 103 as mentioned above, the Web server 104 forms a list of the data by the client display data forming unit 203 by taking the form of the structure display data with the tag (HTML). The Web server 104 transfers the client display data to the client terminal 101. The client display data forming unit 203 discriminates device names, product names, and IP addresses regarding the searched printers, a registration situation to the system, and support information, respectively, and forms client display data shown in FIG. 6. The client display data forming unit 203 accesses the driver DB 106 (also called a device driver database) in FIG. 1 and discriminates whether the printer driver corresponding to the device ID information (device ID) of each of the searched printers exists in the driver DB 106 or not. If it exists, it is regarded that the corresponding printer has been supported and "Not Restricted" and the support information are displayed as shown in FIG. 6. If it does not exist in the driver DB 106, it is regarded that the corresponding printer is not supported and "Restricted" and the support information are displayed. Since the printer driver corresponding to the supported printer exists in the driver DB 106, the printer driver can be installed into the Web server 104 by a remote instruction as will be explained hereinlater.

FIG. 6 shows a display screen of the client terminal 101 on which the client display data as a list of the search results of the printers 102 and 103 has been displayed. With respect to all of the printers 102 and 103 connected to the designated subnet, the IP addresses, the registration situation as information showing whether the printer drivers corresponding to the printers 102 and 103 have already been installed in the Web server or not, and the support information showing whether the printers are the printers supported by the Web system or not are displayed on this display screen.

The user selects the printer serving as a target to be supported by the Web system, that is, the printer in which the support information indicates "Not Restricted" from this list. The printer which is not the target to be supported, that is, the printer in which the support information indicates "Restricted" cannot be selected. If the printer driver corresponding to the selected printer has been installed in the Web server 104, by marking a "Select" check box of a list item of the printer and pressing the "Next" button, the output destination is selected. If the printer driver corresponding to the selected printer is not installed in the Web server 104, that is, if the registration situation is "Unregistered," in order to install the printer driver into the Web server 104, the "Select" check box of the list item of the selected printer is marked and the "Next" button is pressed. In step S103 in FIG. 3, thus, the Web server 104 is notified of a printer registering instruction from the client 101, that is, an installing instruction of the printer driver (POST command of the HTTP including a device type, a device name (corresponding to the device ID), and an IP address). After the instruction is discriminated by the client instruction analyzing unit 201, the installation of the printer selected by the user into the Web server 104 is started.

Figure 7:
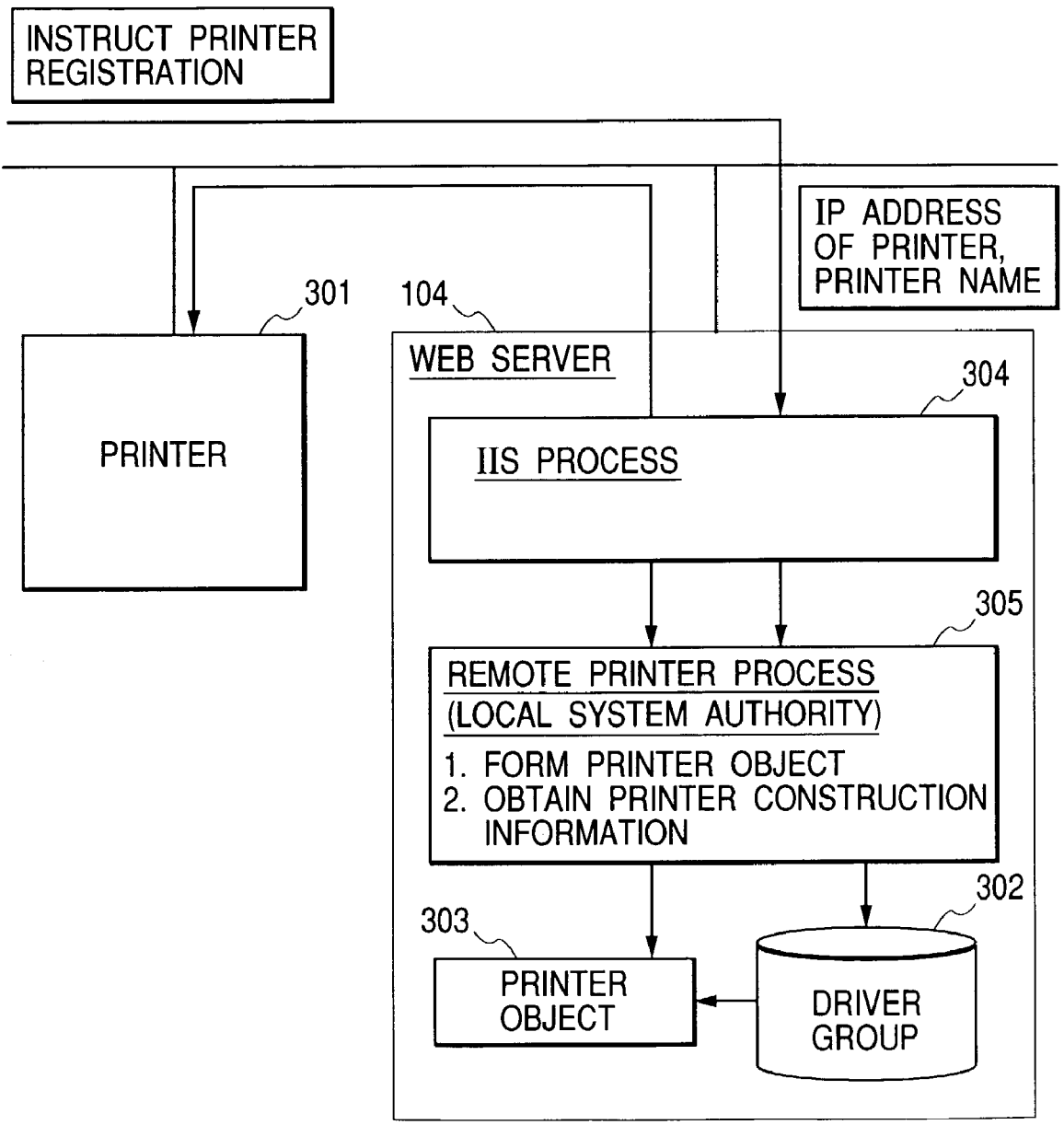
FIG. 7 is a schematic diagram showing a flow of information in the Web server for explaining a driver installing step in the remote print system according to the embodiment of the invention.

FIG. 7 is a schematic diagram showing a flow of the information in the Web server 104 for explaining the driver installing step.

Reference numeral 304 denotes an IIS (Internet Information Server) process. The IIS process is Internet server software developed by Microsoft Corporation in U.S.A. Functions of various servers such as Web server, FTP server, SMTP server, limited NNTP server, and the like are integrated in this Internet server software. Since the embodiment is described by using the Windows OS, the IIS process is used. However, if a platform is the UNIX system, a Web server process such as iPlanet, Apache, or the like is used. The invention is not particularly limited to the IIS process.

The IIS process can make an external program operative in an interlocking relational manner by using an ISAPI (Internet Server Application Programming Interface). The ISAPI is a program interface, which is opened to the external program for the purpose of extending the functions by Microsoft Internet Information Server (IIS) as a Web server. For example, in the case of executing a process according to an input from a WWW client, in a general WWW server, a method of activating the external program by using an interface called CGI (Common Gateway Interface) is used. According to this method, however, since the external program is executed as a process different from the WWW server, it is generally accompanied with a process forming process of a large load. Particularly, in the case where accesses from a plurality of clients are simultaneously executed, such a load is a large problem. On the other hand, in the IIS process, a program interface called ISAPI is prepared to thereby enable a program for realizing such an extending function of the Web server to be formed as a DLL (Dynamic Link Library) of Windows NT, thereby enabling it to be executed by the same context (process) as the IIS. By using the ISAPI, there are advantages such that the functions of the Web server can be finely controlled by using an API which is provided by the IIS and, at the same time, the load upon execution can be reduced. As an extending program using the ISAPI, there is an ordinary extending program (called ISAPI extension) of a type for executing some process in accordance with an input from the client.

Therefore, a new application server which is made operative in an interlocking relational manner by using the ISAPI can be formed by a printer vendor or the like. The new application server formed here is a remote printer process 305. The remote printer process 305 corresponds to an application server including the port constructing unit 204, driver installing unit 205, and printer construction information obtaining/setting unit 206 in FIG. 2.

Upon registering instruction of the printer, the printer driver is installed by using the information of the device type, the IP address of the printer, and the device ID information (device ID/device name) included in the POST command, which is the installing instruction of the printer driver notified from the client terminal 101 to the Web server 104.

First, in step S104 in FIG. 3, the remote printer process 305 called by the IIS process 304 as a Web server function (software) by using the ISAPI extension obtains the device driver corresponding to the device ID information (device ID) of a corresponding printer 301 from a driver group 302 stored in the driver DB 106.

Subsequently, the port constructing unit 204 of the remote printer process 305 registers the IP address to a TCP/IP port, thereby forming a printer port and setting its communication protocol. On the basis of the device ID information (device ID/device name) included in the installing instruction of the device driver, the driver installing unit 205 of the remote printer process 305 reads out the corresponding printer drivers from the driver group 302 in the driver DB 106, installs them via the OS in association with this port, and finally collects them as a printer object 303. In the remote print system according to the embodiment, those processing steps are executed by the resident remote printer process 305, and when the printer driver is installed, permission of the OS to install the printer driver is necessary.

That is, to install the printer driver, it is necessary that a process serving as a principal process has authority as an administrator. However, since the IIS process 304 as Web server software which receives the installing instruction from the client 101 by the remote operation operates by a Guess process, the permission of the OS is not obtained, so that the printer driver cannot installed into the Web server 104. Therefore, the IIS process 304 of the Web server calls the remote printer process 305 by using the ISAPI extension. The remote printer process 305 called by using the ISAPI extension can operate under local system authority under which an access to local resources is possible under authority of the administrator. Therefore, the remote printer process 305, which was called by the ISAPI extension and has the local system authority (administrator authority) receives a request for installation of the printer driver from the IIS process 304. The remote printer process 305 which received the request forms the printer port mentioned above and installs the printer driver via the OS.

After that, in step S106 in FIG. 3, to obtain the construction information of the device, the printer construction information obtaining/setting unit 206 of the remote printer process 305 inquires of the printer 301 via the network what kind of function has been equipped for it. For example, if information showing that the printer 301 has a finisher and can use a function such as staple or punch hole, or the like can be obtained, the function which can be used in the device is recorded into the printer object 303 of the driver in which the installation has been completed. Since a protocol for inquiring of the printer is a known technique, its detailed explanation is omitted here.

Upon setting of a print style on the client terminal 101 side, the Web server 104 inquires of the printer object, so that the construction information of the device is obtained and used to display only the items which can be set by the printer device onto the client terminal 101. Thus, the user can make a print instruction according to the construction information of the device and print by the printer 301 just after the installation into the server as his desire.

According to the embodiment as mentioned above, the user can install the printer driver corresponding to the printer 301 by which he wants to print by the remote operation into the Web server 104. Moreover, since the construction of the printer port, setting of the communication protocol, and the like are automatically executed on the Web server 104 side, troublesomeness upon installing can be eliminated.

On the display screen of the client 101 shown in FIG. 4, "Registered" showing that the registration situation has already been registered is displayed with respect to the target printer in which the printer driver has been installed.

Figure 8:
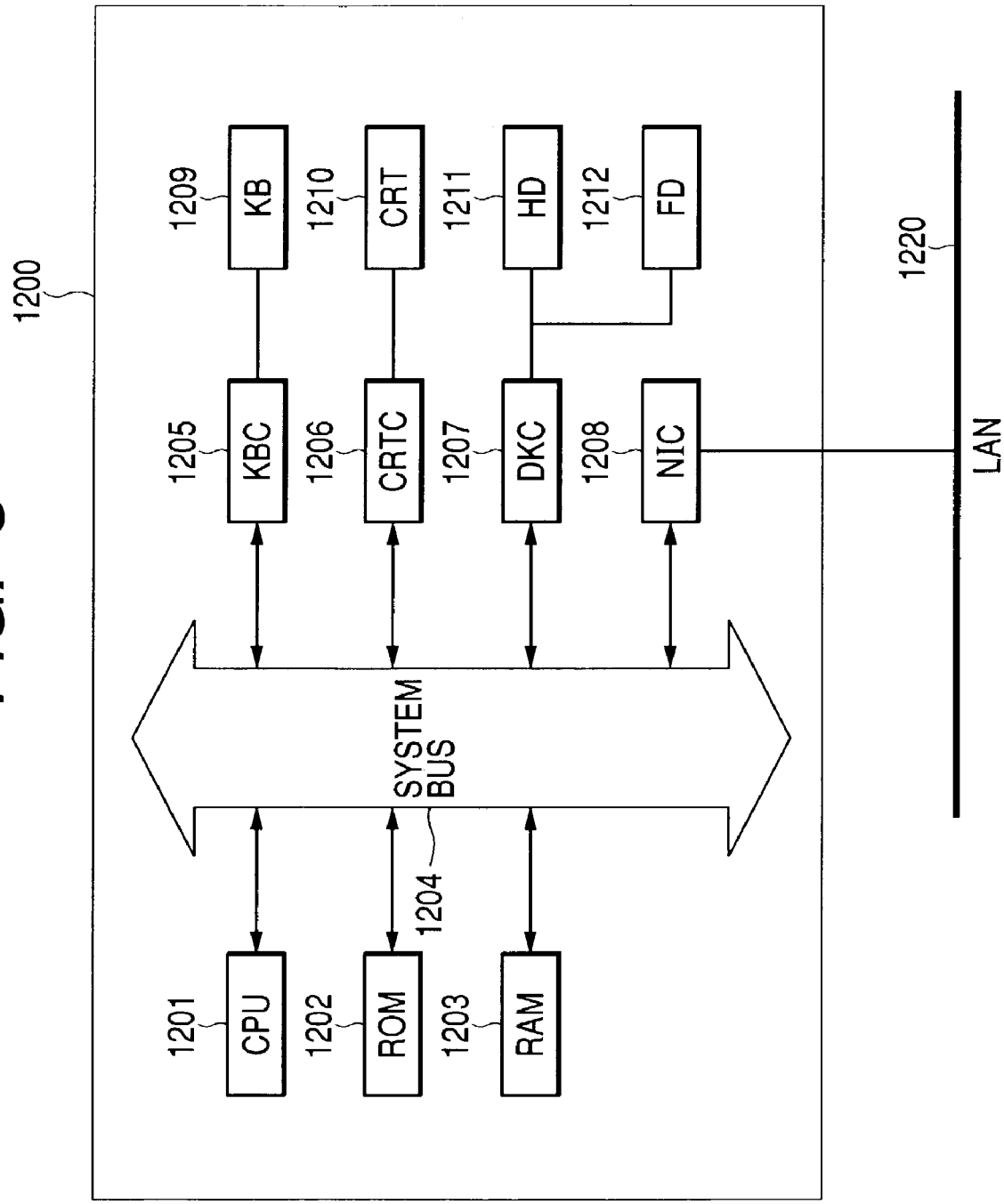
FIG. 8 is a schematic diagram showing an internal construction of a general personal user terminal apparatus.

In the Web server 104 of the invention, as shown in FIG. 8, a plurality of documents have been stored in a hard disk (HD) 1211 (document storage). In the Web server 104, when an NIC 1208 receives the print instruction from the client 101, a CPU 1201 discriminates the printer on the output destination side included in the print instruction. Since the printer driver has already been installed in such a printer as mentioned above, the printer forms print data on the basis of the designated document by using the printer driver and outputs the formed print data to the port on the output destination side set in the printer driver. Thus, the print instruction can be made from the client 101 to the Web server 104 by the remote operation, the forming process of the print data is executed in the Web server, and the formed print data is transmitted to the designated printer and printed.

Although the case of using the browser as an application of the client terminal 101 has been presumed in the embodiment, an ordinary application can be used. In this case, a communication path between the client and the server can be assured by implementing a resident type program such as a service or the like into the server instead of the Web server. The installing process can be also requested to the remote printer process of the server from the implemented program by inter-process communication.

Each function constructing the remote print system and the printer registering method according to the embodiment can be realized by a method whereby a program stored in the RAM, ROM, or the like of the computer operates. Such a program and a computer-readable recording medium in which the program has been recorded are incorporated in the embodiment of the invention.

Specifically speaking, the program is recorded into the recording medium such as a CD-ROM or provided to the computer via various transmitting media. As a recording medium for recording the program, besides the CD-ROM, a flexible disk, a hard disk, a magnetic tape, a magnetooptic disk, a nonvolatile memory card, or the like can be used. As a transmitting medium of the program, it is possible to use a communication medium (a wire line such as an optical fiber or the like, a wireless line, or the like) in a computer network (a LAN, a WAM such as Internet or the like, a wireless communication network, or the like) system for propagating program information as a propagation wave and supplying it can be used.

Such a program is incorporated in the embodiment of the invention not only in the case where the computer executes the supplied program, so that the functions of the embodiments mentioned above are realized but also in the case where the functions of the embodiments mentioned above are realized by the program in cooperation with an OS (Operating System) which is operating in the computer, another application software, or the like, or in the case where all or a part of processes of the supplied program are executed by a function expanding board or a function expanding unit of the computer, so that the functions of the embodiments mentioned above are realized.

For example, FIG. 8 is a schematic diagram showing an internal construction of a general personal user terminal apparatus. In FIG. 8, reference numeral 1200 denotes a computer (PC). The PC 1200 has the CPU 1201, executes device control software which has been stored in a ROM 1202 or the HD 1211 or is supplied from a flexible disk drive (FD) 1212, and integratedly controls the devices connected to a system bus 1204.

As many apparently widely different embodiments of the present invention can be made without departing from the spirit and scope thereof, it is to be understood that the invention is not limited to the specific embodiments thereof except as defined in the appended claims.

According to the embodiments, in the remote print system, since the Web server has the client instruction analyzing unit, printer searching unit, client display data forming unit, port constructing unit, driver installing unit, and further, printer construction information obtaining/setting unit, the client can install the printer by which he wants to print by the remote operation into the server. Moreover, since the construction of the printer port, setting of the communication protocol, and the like are automatically executed on the server side, troublesomeness upon installing can be eliminated.

As described above, according to the invention, on the basis of the installing instruction of the device driver from the client which is connected via the network, the construction of the port and the installation of the device driver are executed by the processing unit having the local system authority, so that the printer driver can be easily installed into the print managing apparatus by the remote instruction from the client.

What is claimed is:

1. A print managing apparatus connected to a client and an output device via a network, the print managing apparatus being a general-purpose computer provided with an operating system which controls a printer process having local system authority and processes having authority other than the local system authority, the print managing apparatus comprising:

installing instruction receiving means for receiving, through a web application, a post command representing an installing instruction by the print managing apparatus from the client via the network;

activating means for activating the printer process by the local system authority using the web application, when said installing instruction receiving means receives an HTTP post command;

print port constructing means for, in response to the reception of the installing instruction of a device driver from the client by the print managing apparatus via the network, constructing, under control by the printer process activated by said activating means, a print port by the print managing apparatus corresponding to the output device on the basis of an IP address of the output device included in the post command received from the client;

driver installing means for, in response to the reception of the installing instruction of the device driver from the client by the print managing apparatus via the network, installing by the print managing apparatus the device driver corresponding to the output device on the basis of device identification information included in the installing instruction received from the client;

reception means for receiving print data by the print managing apparatus;

transmission means for transmitting by the print managing apparatus the print data received by said receiving means to the output device using the print port constructed by said print port constructing means; and a Web server processing unit for making data communication with a browser on said client, wherein said print port constructing means and said driver installing means operate under control of the printer process activated by said activating means by the local system authority, and wherein a remote printer process including said print port constructing means and said driver installing means is called from said Web server processing unit under the local system authority.

2. An apparatus according to claim 1 wherein said Web server processing unit is an IIS process and said remote printer process is called from the IIS process by ISAPI extension.

3. An apparatus according to claim 1, further comprising:
storing means for storing a document to be printed; and
print instruction receiving means for receiving a print instruction for the document stored in said storing means from said client,
wherein a control is made in a manner such that when the print instruction is received by said print instruction receiving means, print data is formed from the document stored in said storing means shown by the print instruction by using a printer driver installed by said driver installing means and outputted to the port on the output destination side constructed by said print port constructing means.

4. An apparatus according to claim 1, further comprising:
client instruction analyzing means for discriminating the instruction from said client;
printer searching means for, when it is determined by said client instruction analyzing means that the instruction from said client is a printer search instruction, searching printers connected to a subnet designated by said instruction; and client display data forming means for forming client display data to be displayed by said client on the basis of information obtained by the search by said searching means.

5. An apparatus according to claim 3, further comprising:
printer construction information obtaining means for obtaining construction information of a printer for the printer driver installed by said driver installing means; and
printer construction information setting means for setting said construction information obtained by said printer construction information obtaining means into a printer object of the installed printer driver.

6. A device driver registering method in a print managing apparatus connected to a client and an output device via a network, the print managing apparatus being a general-purpose computer provided with an operating system which controls a printer process having local system authority and processes having authority other than the local system authority, the method comprising:

an installing instruction receiving step of receiving, through a web application, a post command representing an installing instruction by the print managing apparatus from the client via the network;

an activating step of activating the printer process by the local system authority using the web application when said installing instruction receiving means receives an HTTP post command;

a print port constructing step of, in response to the reception of the installing instruction of a device driver from the client by the print managing apparatus via the network, constructing, under control of the printer process activated in said activating step, a print port by the print managing apparatus corresponding to the output device on the basis of an IP address of the output device included in the post command received from the client;

a driver installing step of, in response to the reception of the installing instruction of the device driver from the client by the print managing apparatus via the network, installing by the print managing apparatus the device driver corresponding to the output device on the basis of device identification information included in the installing instruction received from the client;

a receiving step of receiving print data by the print managing apparatus; and a transmitting step of transmitting by the print managing apparatus the print data received in said receiving step to the output device using the print port constructed in said print port constructing step, wherein said print port constructing step and said driver installing step operate under control by the printer process activated in said activating step by the local system authority, wherein said print managing apparatus has a Web server process for making data communication with a browser on said client and a remote printer process for executing said Dort constructing step, and wherein said driver installing step is called from said Web server process under the local system authority.

7. A method according to claim 6, wherein said Web server process is an IIS process and said remote printer process is called from the IIs process by ISAPI extension.

8. A method according to claim 6, further comprising:
a storing step of storing a document to be printed into storing means; and a print instruction receiving step of receiving a print instruction for the document stored in said storing means from said client, and wherein a control is made in a manner such that when the print instruction is received by said print instruction receiving step, print data is formed from the document stored in said storing means shown by the print instruction by using a printer driver installed by said driver installing step and outputted to the port on the output destination side constructed by said print port constructing step.

9. A method according to claim 6, further comprising:

a client instruction analyzing step of discriminating the instruction from said client;

a printer searching step of, when it is determined in said client instruction analyzing step that the instruction from said client is a printer search instruction, searching printers connected to a subnet designated by said instruction; and a client display data forming step of forming client display data to be displayed by said client on the basis of information obtained by the search in said searching step.

10. A method according to claim 8, further comprising:

a printer construction information obtaining step of obtaining construction information of a printer for the printer driver installed by said driver installing step; and a printer construction information setting step of setting said construction information obtained by said printer construction information obtaining step into a printer object of the installed printer driver.

11. A device driver registering program stored in a computer-readable medium, which is executed by a print managing apparatus connected to a client and an output device via a network, the print managing apparatus being a general-purpose computer provided with an operating system which controls a printer process having local system authority and processes having authority other than the local system authority, wherein said program allows said print managing apparatus to execute:

an installing instruction receiving step of receiving, through a web application, a post command representing an installing instruction by the print managing apparatus from the client via the network;

an activating step of activating the printer process by the local system authority using the web application, when said installing instruction receiving step receives an HTTP post command;

a print port constructing step of, in response to the reception of the installing instruction of a device driver from the client by the print managing apparatus via the network, constructing, under control by the printer process activated in said activating step, a print port by the print managing apparatus corresponding to the output device on the basis of an IP address of the output device included in the post command installing instruction received from the client;

a driver installing step of, in response to the reception of the installing instruction of the device driver from the client by the print managing apparatus via the network, installing by the print managing apparatus the device driver corresponding to the output device on the basis of device identification information included in the installing instruction received from the client;

a receiving step of receiving print data by the print managing apparatus; and a transmitting step of transmitting by the print managing apparatus the print data received in said receiving step to the output device using the print port constructed in said print port constructing step, wherein said print port constructing step and said driver installing step operate under control of the printer process activated in said activating step by the local system authority, wherein said print managing apparatus has a Web server process for making data communication with a browser on said client and a remote printer process for executing said port constructing step, and wherein said driver installing step is called from said Web server process under the local system authority.

12. A program according to claim 11 wherein said Web server process is an IIS process and said remote printer process is called from the IIS process by ISAPI extension.

13. A program according to claim 11, wherein said program allows said print managing apparatus to further execute:

a storing step of storing a document to be printed into storing means; and a print instruction receiving step of receiving a print instruction for the document stored in said storing means from said client, wherein a control is made in a manner such that when the print instruction is received by said print instruction receiving step, print data is formed from the document stored in said storing means shown by the print instruction by using a printer driver installed by said driver installing step and outputted to the port on the output destination side constructed by said port constructing step.

14. A program according to claim 11, wherein said program allows said print managing apparatus to further execute:

a client instruction analyzing step of discriminating the instruction from said client;

a printer searching step of, when it is determined in said client instruction analyzing step that the instruction from said client is a printer search instruction, searching printers connected to a subnet designated by said instruction; and a client display data forming step of forming client display data to be displayed by said client on the basis of information obtained by the search in said searching step.

15. A program according to claim 13, wherein said program allows said print managing apparatus to further execute:

a printer construction information obtaining step of obtaining construction information of a printer for the printer driver installed by said driver installing step; and a printer construction information setting step of setting said construction information obtained by said printer construction information obtaining step into a printer object of the installed printer driver.

16. A computer-readable medium storing a computer program for a device driver registering method in a print managing apparatus connected to a client and an output device via a network, the print managing apparatus being a general-purpose computer provided with an operating system which controls a printer process having local system authority and processes having authority other than the local system authority, the method comprising:

an installing instruction receiving step of receiving, through a web application, a post command representing an installing instruction by the print managing apparatus from the client via the network;

an activating step of activating the printer process by the local system authority using the web application, when said installing instruction receiving step receives an HTTP post command;

a print port constructing step of, in response to the reception of the installing instruction of a device driver from the client by the print managing apparatus via the network, constructing, under control by the printer process activated in said activating step, a print port by the print managing apparatus corresponding to the output device on the basis of an IP address of the output device included in the post command received from the client;

a driver installing step of, in response to the reception of the installing instruction of the device driver from the client by the print managing apparatus via the network, installing by the print managing apparatus the device driver corresponding to the output device on the basis of device identification information included in the installing instruction received from the client;

a receiving step of receiving print data by the print managing apparatus; and a transmitting step of transmitting by the print managing apparatus the print data received in said receiving step to the output device using the print port constructed in said print port constructing means, wherein said print port constructing step and said driver installing step operate under control of the printer process activated in said activating step by the local system authority, wherein said print managing apparatus has a Web server process for making data communication with a browser on said client and a remote printer process for executing said port constructing step, and wherein said driver installing step is called from said Web server process under the local system authority.

* * * * *